(12) United States Patent
Good

(10) Patent No.: US 10,227,143 B2
(45) Date of Patent: Mar. 12, 2019

(54) LOCK ACTUATION SYSTEM FOR AIRCRAFT

(71) Applicant: The Boeing Company, Chicago, IL (US)

(72) Inventor: Mark S. Good, Seattle, WA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 14/303,443

(22) Filed: Jun. 12, 2014

(65) Prior Publication Data

US 2015/0360770 A1 Dec. 17, 2015

(51) Int. Cl.
| | | |
|---|---|---|
| B64C 13/38 | (2006.01) | |
| B64D 45/00 | (2006.01) | |
| B64C 3/56 | (2006.01) | |

(52) U.S. Cl.
CPC ............ B64D 45/0005 (2013.01); B64C 3/56 (2013.01); *Y10T 74/20012* (2015.01)

(58) Field of Classification Search
CPC .. B64C 13/34; B64C 9/34; B64C 5/10; B64C 5/12; B64C 3/42; E05Y 2900/502; E05Y 2900/53; E05D 11/1007; F16H 2037/102; F16H 2037/2048; F16H 2037/204; F16H 37/00
USPC ...................................................... 244/199.3
See application file for complete search history.

(56) References Cited

U.S. PATENT DOCUMENTS

| | | | | |
|---|---|---|---|---|
| 3,806,083 A | * | 4/1974 | Phillips | ............... F16K 31/1635 251/229 |
| 5,201,479 A | * | 4/1993 | Renzelmann | ............. B64C 3/56 244/49 |
| 5,381,986 A | | 1/1995 | Smith et al. | |
| 5,427,329 A | * | 6/1995 | Renzelmann | ............. B64C 3/56 244/49 |
| 5,452,643 A | * | 9/1995 | Smith | ....................... B64C 3/56 475/332 |
| 7,464,896 B2 | * | 12/2008 | Carl | ......................... B64C 5/10 244/99.2 |

(Continued)

FOREIGN PATENT DOCUMENTS

| | | |
|---|---|---|
| EP | 2727826 | 5/2014 |
| WO | 2007125163 | 11/2007 |

OTHER PUBLICATIONS

European Search Report for European Application No. 15171934.1 dated Nov. 18, 2015.

(Continued)

*Primary Examiner* — Medhat Badawi
*Assistant Examiner* — Vicente Rodriguez
(74) *Attorney, Agent, or Firm* — Kunzler, PC

(57) ABSTRACT

Described herein is a system that includes an actuator with a movable input, a first summing mechanism with an input, a first output, and a second output. The input of the first summing mechanism is movably driven by the movable input of the actuator and the first output of the first summing mechanism is movably coupled to a first actuatable element. The system also includes an end mechanism with an input and a first output. The input of the end mechanism is movably driven by the second output and the first output of the end mechanism is movably coupled to a second actuatable element. The system further includes a sensor that senses a position of the rotational input of the actuator. A status of the first and second actuatable elements is based on a sensed position of the movable input of the actuator.

20 Claims, 8 Drawing Sheets

(56) References Cited

U.S. PATENT DOCUMENTS

| | | | |
|---|---|---|---|
| 8,089,034 B2* | 1/2012 | Hammerquist | B64C 3/56 244/3.27 |
| 8,733,692 B2* | 5/2014 | Kordel | B64C 3/56 244/49 |
| 2010/0001678 A1* | 1/2010 | Potter | B64C 13/50 318/569 |
| 2012/0228424 A1 | 9/2012 | Parker | |
| 2013/0092111 A1 | 4/2013 | Hioka et al. | |

OTHER PUBLICATIONS

EP Office Action for European Patent Application No. 15171934.1 dated Apr. 19, 2018.

\* cited by examiner

LOCK ACTUATION SYSTEM FOR AIRCRAFT

FIELD

This disclosure relates generally to actuator systems, and more particularly to an actuator system for actuating a lock of an aircraft.

BACKGROUND

Actuator systems are used for a variety of reasons on a variety of structures. Generally, actuator systems are designed to move at least one component relative to another component to achieve a desired result. Often, some actuator systems move multiple components in a controlled manner.

For safety, certain actuator systems utilize a sensor to confirm that a desired actuation of a component has occurred. Actuator systems that move multiple components often have multiple sensors each used to confirm actuation of a respective one of the multiple components.

SUMMARY

The subject matter of the present application has been developed in response to the present state of the art, and in particular, in response to shortcomings of conventional actuator systems. One such shortcoming includes the need for multiple electrical sensors to diagnose the status of multiple actuated components. For example, some conventional actuator systems include multiple actuated components branching off of a main driveline. In such systems, each branch driveline has its own sensor for sensing the status of the actuated component of that branch driveline. Because electrical sensors can be unreliable, increasing the number of sensors in an actuator system can reduce the overall reliability of the system.

The subject matter of the present application has been developed to provide an apparatus, system, and method that overcome at least some of the above-discussed shortcomings of prior art techniques. More particularly, in some embodiments, described herein is an apparatus, system, and method for actuating multiple actuatable components of separate branches off of a main driveline, and sensing the status of the actuatable components using a single electrical sensor. The branches are coupled together by at least one mechanical summing mechanism in some implementations, and multiple mechanical summing mechanisms in other implementations. Although, in some implementations, the actuator system of the present disclosure may include additional mechanical components compared to conventional actuator systems, because mechanical components are generally more reliable than electrical components, the fewer electrical components and additional mechanical components of some implementations of the actuator system of the present disclosure increases the overall reliability of the system. Additionally, according to certain embodiments, the status of a primary component, which is dependent on the status of an actuatable component of a given branch, can be determined based on the sensed status of the actuatable component without the use of an additional electrical sensor for sensing the status of the primary component.

According to one embodiment, a system includes an actuator providing a movable input. The system also includes a first summing mechanism with an input, a first output, and a second output. The input of the first summing mechanism is movably driven by the rotational input of the actuator and the second output of the first summing mechanism is movably coupled to a first actuatable element. The system also includes an end mechanism with an input and a first output. The input of the end mechanism is movably driven by the first output of the first summing mechanism and the first output of the end mechanism is movably coupled to a second actuatable element. The system further includes a sensor that senses a position of the rotational input of the actuator. Additionally, the system includes a controller that determines a status of the first and second actuatable elements based on a sensed position of the movable input of the actuator.

In some implementations, the system further includes a second summing mechanism with an input movably driven by the first output of the first summing mechanism, a second output coupled to a third actuatable element, and a first output movably coupled to the input of the end mechanism. The input of the end mechanism is movably driven by the first output of the first summing mechanism via the second summing mechanism. The controller determines the status of the third actuatable element based on the sensed position of the input of the first summing mechanism.

According to certain implementations of the system, the end mechanism includes a second summing mechanism. The input of the end mechanism is an input of the second summing mechanism and the first output of the end mechanism is a first output of the second summing mechanism. The second summing mechanism of the end mechanism further includes a second output, where the second output of the second summing mechanism is non-movably fixed relative to the input and first output of the second summing mechanism.

According to some implementations, the movable input is a rotational input, the input of the first summing mechanism is rotatably driven by the rotational input of the actuator, the second output of the first summing mechanism is rotatably coupled to the first actuatable element, the input of the end mechanism is rotatably driven by the first output of the first summing mechanism, the first output of the end mechanism is rotatably coupled to the second actuatable element, the sensor senses an angular position of the rotational input of the actuator, and the controller determines the status of the first and second actuatable elements based on a sensed angular position of the rotational input of the actuator. In certain implementations of the system, the first summing mechanism includes a differential. The end mechanism can include a differential in some implementations.

According to some implementations, the system also includes first and second latch pin assemblies. Each of the first and second actuatable elements can include a lock of the first and second latch pin assemblies, respectively. Each latch pin assembly may include a latch pin that is actuatable between first and second positions. The controller determines whether the latch pins of the latch pin assemblies are in the first or second positions based on the status of the locks.

In some implementations of the system, the controller determines a first status of at least one of the first and second actuatable elements if the sensed position of the movable input is within a first positional range, and determines a second status of at least one of the first and second actuatable elements if the sensed position of the movable input is within a second positional range outside of the first positional range. The system may also include first and second stop pairs. The first stop pair may include two stops that limit a range-of-motion of the first actuatable element, and the second stop pair may include two stops that limit a rangeof-motion of the second actuatable element. Although in some implementations, the stops are fixed, in other implementations, at least one stop of the first and second stop pairs can be extendable to limit the range-of-motion of a respective one of the first and second actuatable elements, and retractable to not limit the range-of-motion of the respective one of the first and second actuatable elements.

According to another embodiment, a system includes an actuator providing a rotational input. The system also includes a first summing mechanism that is rotatably driven by the rotational input of the actuator. Additionally, the system includes one of a second summing mechanism and non-summing mechanism rotatably driven by the first summing mechanism. The one of the second summing mechanism and non-summing mechanism rotatably drives a first actuatable element. The system further includes a sensor that senses an angular position of the rotational input of the actuator. Also, the system includes a controller that determines a status of the first actuatable element based on a sensed angular position of the rotational input of the actuator.

In some implementations of the system, the first summing mechanism rotatably drives a second actuatable element. The controller determines a status of the second actuatable element based on the sensed angular position of the rotational input of the actuator. The one of the second summing mechanism and non-summing mechanism can be the second summing mechanism, and the system can further include a third summing mechanism that is rotatably driven by the second summing mechanism. The third summing mechanism rotatably drives a third actuatable element. The controller determines a status of the third actuatable element based on the sensed angular position of the rotational input of the actuator. The output of the second summing mechanism can be rotatably locked. The first actuatable element and second actuatable element can be sequentially driven by the one of the second summing mechanism and non-summing mechanism, and the first summing mechanism, respectively. Additionally, the system can include first and second latch pin assemblies that each have a latch pin actuatable between an engaged position and a non-engaged position. The latch pins of the first and second latch pin assemblies can be co-axial, and each of the first and second actuatable elements can include a lock of the first and second latch pin assemblies, respectively.

According to some implementations, the system also includes a third summing mechanism that is rotatably driven by the first summing mechanism. The third summing mechanism rotatably drives a second actuatable element. The controller determines a status of the second actuatable element based on the sensed angular position of the rotational input of the actuator. Each of the first and second summing mechanisms can include a differential.

In certain implementations, the system includes an aircraft that has a foldable wingtip. The aircraft includes first and second latch pin assemblies that each have a latch pin actuatable between a first position engaged with the foldable wingtip and a second position not engaged with the foldable wingtip. Each of the first and second actuatable elements includes a lock of the first and second latch pin assemblies, respectively.

According to yet another embodiment, a method includes rotating an input shaft of a summing mechanism and sensing an angular position of the input shaft of the summing mechanism. The method also includes rotating a first actuatable element rotatably coupled to a second output shaft of the summing mechanism, rotatably driving an input shaft of an end mechanism via a first output shaft of the summing mechanism, and rotating a second actuatable element rotatably coupled to a first output shaft of the end mechanism. Additionally, the method includes determining statuses of the first and second actuatable elements based on the angular position of the input shaft of the summing mechanism.

In some implementations of the method, the summing mechanism is a first summing mechanism and the end mechanism includes a second summing mechanism with a second output shaft. The method can further include rotatably fixing the second output shaft of the second summing mechanism.

According to certain implementations of the method, rotating the first actuatable element includes restricting a range-of-motion of the first actuatable element between two fixed or movable stops, and rotating the second actuatable element comprises restricting a range-of-motion of the second actuatable element between two fixed or movable stops.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
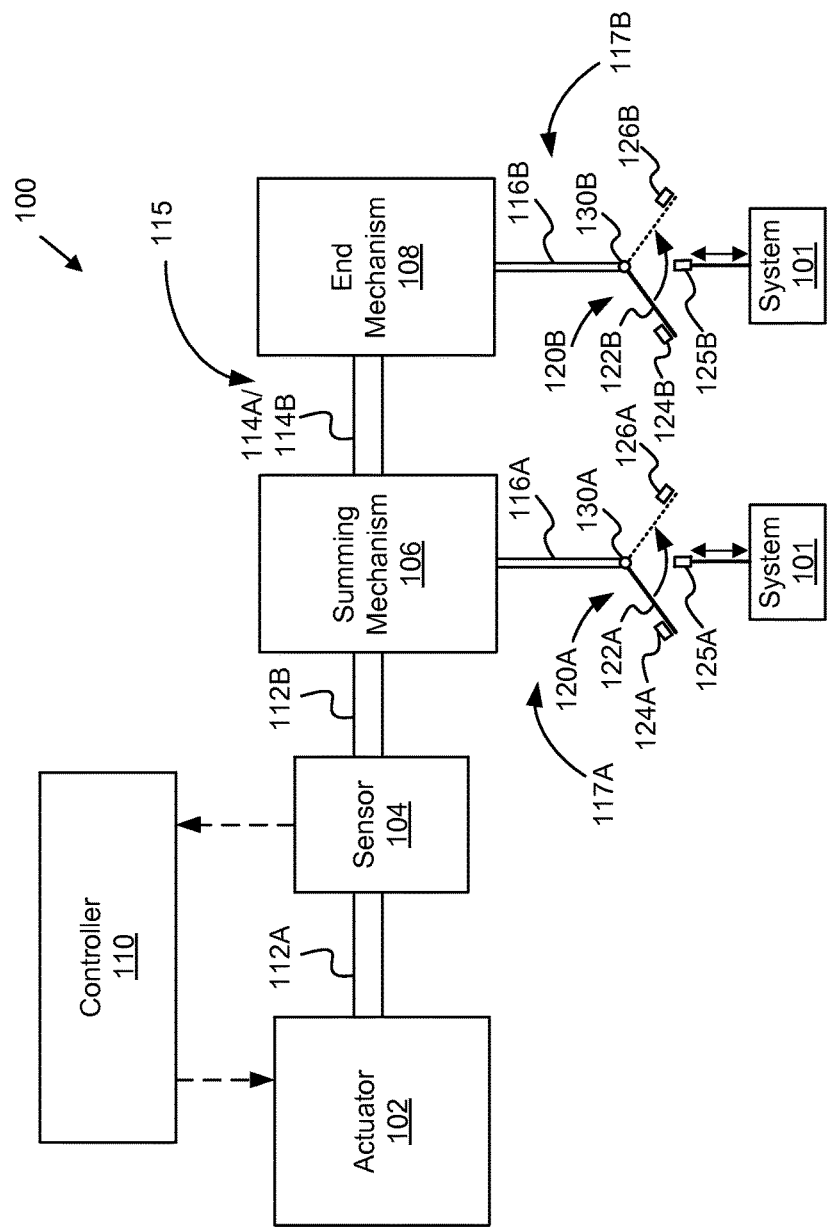
FIG. 1 is a schematic block diagram of an actuator system according to one embodiment.

Referring to FIG. 1, and according to one embodiment, an actuator system 100 includes an actuator 102, a sensor 104, a summing mechanism 106, and an end mechanism 108. Generally, the actuator system 100 is operable to actuate actuatable elements 122A, 122B coupled to the summing mechanism 106 and end mechanism 108, respectively. The actuator system 100 can form part of or be used with any of various apparatus and systems for any of various applications requiring actuation of components. For example, in one particular implementation, the actuator system 100 forms part of an aircraft to actuate components of a latch pin assembly for a foldable wingtip of the aircraft (see, e.g., FIG. 6). The actuator system 100 also includes a controller 110 that, in some implementations, determines a status or condition of the actuatable elements 122A, 122B based on the sensed position of an actuator rotational input 112A obtained from the sensor 104. The controller 110 may also be configured to determine the status or condition of other actuatable elements directly or indirectly linked to the actuatable elements 122A, 122B. For example, according to some implementations, the controller 110 determines a position of latch pins of a latch pin assembly, where the actuatable elements 122A, 122B are latch pin locks, based on the sensed position of the actuator rotational input 112A (see, e.g., FIG. 6).

The actuator system 100 includes a main driveline 115 and first and second branch drivelines 117A, 117B that are separately driven by the main driveline 115. The main driveline 115 includes a rotational input 112A driven by the actuator 102. The actuator 102 can be any of various actuators configured to generate a rotational input. In one implementation, the actuator 102 is a motor, such as an electrical-powered, magnetic-powered, pneumatic-powered, or hydraulic-powered motor. In certain implementations, the actuator 102 may include one or more external features that enable the actuator to be operated or powered manually by a user. The rotational input 112A can be a rotatable output shaft of the actuator 102 in some implementations, or form part of an input shaft of the first summing mechanism 106.

An angular position of the rotational input 112A is sensed by the sensor 104. More specifically, the sensor 104 measures the amount of rotation of the rotational input 112A relative to a fixed object. Accordingly, the sensor 104 can be any of various angular position or rotary sensors configured to detect an angular position of a rotating object. Alternatively, the sensor 104 can be a linear sensor (e.g., linear variable differential transformer) that detects rotation of the rotational input 112A via a rotational-to-linear motion mechanism (e.g., rack-and-pinion). In some implementations, the sensor 104 is capable of detecting at least three positional states of the rotational input 112A, which include a first end or start state, a second end or stop state, and a non-end state. In other words, the sensor 104 can detect at least the angular position of the rotational input 112A at the start of rotation, the angular position of the rotational input at the end of rotation, and whether the rotational input is rotating (i.e., has not stopped). Although the sensor 104 is shown as a single sensor, the sensor 104 can be a combination of sensors. Nevertheless, whether a single sensor or multiple sensors, the sensor(s) senses rotational information (e.g., angular position) of just the rotational input 112A to determine the status of the actuatable elements 122A, 122B.

As indicated by directional arrows in FIG. 1, the controller 110 sends electrical control signals to the actuator 102 and receives electrical input signals from the sensor 104. The electrical control signals relay commands from the controller 110 to start and stop actuation of the actuator 102. In other words, the controller 110 commands the actuator 102 to start rotation of the rotational input 112A and stop rotation of the rotational input. The electrical input signals received from the sensor 104 include information regarding the angular position of the rotational input 112A sensed by the sensor. The information included in the electrical input signals may also include the start, stop, and rotating statuses of the rotational input 112A. Although not shown, the controller 110 may include modules configured to generate and transmit the electrical control signals to the actuator 102 and process the electrical input signals received from the sensor 104, respectively. The module for processing the electrical input signals may include memory for storing the angular position and/or status information sensed by the sensor 104, and comparing the stored information to determine one or more statuses of the actuatable elements 122A, 122B, and/or one or more statuses of other actuatable elements linked to the actuatable elements 122A, 122B, as will be explained in more detail below. For example, in one implementation, where the actuatable elements 122A, 122B are locks for respective latch pins, the controller 110 can be configured to determine whether the locks are closed or open and/or whether the latch pins are engaged or disengaged based on the angular position and/or status information sensed by the sensor 104. Accordingly, one or more statuses of the actuatable elements 122A, 122B, and/or one or more statuses of other actuatable elements linked to the actuatable elements 122A, 122B, can be determined based on a single sensor 104 sensing the rotational characteristics of the rotational input 112A.

The main driveline 115 further includes the summing mechanism 106, an input 112B of the summing mechanism and a first output 114A of the summing mechanism. The summing mechanism 106 also includes a second output 116A that forms part of a branch driveline 117A branching off of the main driveline 115. The input 112B of the summing mechanism is driven by the rotational input 112A of the actuator 102. In some implementations, the input 112B of the summing mechanism is driven directly by the rotational input 112A. Like the rotational input 112A, the input 112B of the summing mechanism 106 can be a rotatable input shaft. The first and second outputs 114A, 116A of the summing mechanism 106 also can be rotatable output shafts. In some implementations, the rotational input 112A and input 112B form a continuous shaft about which the sensor 104 is positioned. However, in other implementations, the rotational input 112A and the input 112B are separate shafts co-rotatably coupled together with the sensor 104 positioned about one or both of the co-rotating shafts. In yet alternative implementations, the rotational input 112A is not an input shaft, but a receptacle that receives a shaft of the input 112B. In such implementations, the sensor 104 effectively senses the rotation of the input 112B directly, as opposed to indirectly via the rotational input 112A. According to yet another implementation, the input 112B of the summing mechanism 106 can be a receptacle that receives a shaft of the rotational input 112A. Although not shown, the input 112B can also be defined by an input gear of the summing mechanism 106 co-rotatably coupled to a shaft extending between the summing mechanism and actuator 102.

The summing mechanism 106 is a mechanical device configured to receive an input and divide the input into multiple outputs. In the illustrated embodiments, each summing mechanism includes a single input. The relative portion of the input allocated to the multiple outputs is based on the load applied to, or the resistance to rotation of, the multiple outputs. In other words, the division of the input of the summing mechanism 106 between the outputs of the summing mechanism is proportional to the loads applied to the outputs. For example, where the loads applied to the outputs of the summing mechanism 106 are equal, the summing mechanism will equally divide the input between the outputs. In contrast, where the load applied to a first of the outputs of the summing mechanism 106 is more than the load applied to a second of the outputs, the summing mechanism distributes more of the input to the second of the outputs.

Although the input and outputs of the summing mechanism 106 can be characterized by any of several properties associated with the rotation of an object, such as torque, power, rotational velocity, and angular rotation, the property of interest of the rotational input 112A into the summing mechanism 106 is angular rotation. Accordingly, the summing mechanism 106 distributes the angular rotation of the rotational input 112A to a proportional angular rotation of one or more of the outputs 114A, 116A based on the corresponding loads of the outputs. In essence, under proper operation, the combined angular rotation of the outputs 114A, 116A equals a corresponding angular rotation of the rotational input 112A. In this manner, the summing mechanism 106 acts to sum together the angular rotation of the outputs 114A, 116A to equal the same or a scaled amount of angular rotation of the rotational input 112A. Accordingly, by knowing the angular rotation of the rotational input 112A, a speed ratio of the summing mechanism 106, and the loads on the outputs 114A, 116A, the angular rotation of the outputs 114A, 116A can be determined.

In some implementations, the summing mechanism 106 is configured to distribute angular rotation of the rotational input 112A to the outputs 114A, 116A on a 1:1 speed ratio or scale. In other words, for each degree or unit of rotation of the rotational input 112A, the outputs 114A, 116A collectively rotate the same degree or unit of rotation. For summing mechanisms utilizing a gear train, as will be described in more detail below, the speed ratio can be defined in terms of a gear ratio.

According to other implementations, the summing mechanism 106 is configured to distribute angular rotation of the rotational input 112A to the outputs 114A, 116A on a speed ratio or scale more or less than 1:1. In other words, for each degree or unit of rotation of the rotational input 112A, the outputs 114A, 116A collectively rotate a different, but corresponding, number of degrees or units of rotation.

In some embodiments, the summing mechanism 106 is a passive mechanical device that does not add energy to the system 100. For example, in some implementations, the summing mechanism 106 is a mechanical differential, such as a bevel-gear differential, spur-gear differential, planetary-gear differential, and the like. Accordingly, in such implementations, the summing mechanism 106 includes a plurality of gears in gear-meshing engagement with each other to transmit rotational energy between the gears. Alternatively, the summing mechanism 106 can be a non-geared summing mechanism having a summing linkages arrangement.

The main driveline 115 also includes the end mechanism 108 and an input 114B of the end mechanism. The end mechanism 108 also includes a first output 116B that forms part of a branch driveline 117B branching off of the main driveline 115 in a manner similar to the branch driveline 117A. The input 114B of the end mechanism 108 is driven by the first output 114A of the summing mechanism 106, which is driven by the rotational input 112A of the actuator 102. Like the first output 114A, the input 114B can be a rotatable input shaft. In some implementations, as depicted, the first output 114A of the summing mechanism 106 and the input 114B of the end mechanism 108 form a continuous shaft. However, in other implementations, the first output 114A and the input 114B are separate shafts co-rotatably coupled together. In yet alternative implementations, the first output 114A is not an input shaft, but a receptacle that receives a shaft of the input 114B. According to yet another implementation, the input 114B of the end mechanism 108 can be a receptacle that receives a shaft of the first output 114A. Although not shown, the first output 114A and/or input 114B can also be defined by a first output gear of the summing mechanism 106 and an input gear of the end mechanism 108, respectively, co-rotatably coupled to a shaft extending between the end mechanism and the summing mechanism.

The end mechanism 108 is a mechanical device configured to receive an input and distribute or transmit the input to one output in a non-summing arrangement. Accordingly, in certain implementations, the end mechanism 108 distributes an entire input to a single output. Therefore, unlike the summing mechanism 106, the end mechanism 108, which may include a specifically-configured summing mechanism as described below, functions as a non-summing mechanism that does not divide the input between multiple outputs based on the relative loads of the outputs, but rather distributes all the input to a single output independent of the load on the output. As described above, the input can be defined as an angular rotation that is distributed into a corresponding angular rotation of the output. The end mechanism 108 can be designed to distribute angular rotation of the input 114B to angular rotation of the output 116B on a 1:1 speed ratio or scale in some implementations, and on a speed ratio or scale less than or greater than 1:1 in other implementations.

For end mechanisms utilizing a gear train, as will be described in more detail below, the speed ratio can be defined in terms of a gear ratio.

Like the summing mechanism 106, the end mechanism 108 is a passive mechanical device that does not add energy to the system 100 in certain embodiments. For example, the end mechanism 108 can include one or more gears, such as bevel gears, that are in gear-meshing engagement with each other to transmit rotation energy between the gears. According to another example, the end mechanism 108 can include one or more linkages.

The branch drivelines 117A, 117B include analogous features, with like numbers referring to like elements. For example, analogous features of the branch drivelines 117A, 117B have the same reference numbers, but to distinguish the drivelines of which they form a part, the numbers are designated by suffixes A and B, respectively. Accordingly, a description of a feature with an 'A' designation of the branch driveline 117A applies equally to the analogous feature with a 'B' designation of the branch driveline 117B.

Generally, the branch drivelines 117A, 117B are configured to actuate respective actuatable elements 122A, 122B of respective actuatable element assemblies 120A, 120B when driven by the summing mechanism 106 and end mechanism 108, respectively. The branch drivelines 117A, 117B include the respective outputs 116A, 116B of the summing mechanism 106 and end mechanism 108, as well as the respective actuatable element assemblies 120A, 120B. The actuatable element assemblies 120A, 120B further include stops 124A, 124B, 126A, 126B and pivots 130A, 130B. Accordingly, the branch drivelines 117A, 117B include the stops 124A, 124B, 126A, 126B, which restrict the range-of-actuation or range-of-motion of the actuatable elements 122A, 122B. For example, the branch driveline 117A, which can be considered a first branch driveline, includes a pair of stops 124A, 126A with each stop preventing motion beyond respective opposing boundaries of the range-of-motion. The actuation or motion of each actuatable element 122A, 122B is represented schematically by directional arrows as rotation about a pivot 130A, 130B. Therefore, in one embodiment, the actuatable elements 122A, 122B rotate between a first position against a respective first stop 124A, 124B and a second position against a respective second stop 126A, 126B, such that the range-of-motion is between and includes the first and second positions. According to certain implementations, and depending on the application, the first position of the actuatable elements 122A, 122B can be considered an engaged position, closed position, locked position, or other similar position, and the second position of the actuatable elements 122A, 122B can be considered a non-engaged position, open position, unlocked position, or other similar opposing position.

The actuatable elements 122A, 122B can be any of various actuatable elements, components, devices, mechanisms, and the like. Further, although the actuatable elements 122A, 122B are shown as rotatable in the illustrated embodiments, it is recognized that the actuatable elements can be configured to actuate in any of various other ways, such as sliding, twisting, bending, stretching, and the like. In some implementations, the actuatable elements 122A, 122B actuate in direct response to rotation of the respective outputs 116A, 116B. For example, the actuatable elements 122A, 122B can be coupled directly to, and co-rotate with, the respective outputs 116A, 116B.

In operation of the actuator system 100 in a first mode, the controller 110 commands the actuator 102 to actuate the rotational input 112A in a first manner. As used hereinafter, actuation of an object will be described as rotation of that object. However, it is recognized that in some implementations, rotation of an object can be replaced with any of various other ways to actuate the object without departing from the essence of the present disclosure. Rotation of the rotational input 112A in a first direction correspondingly rotates the input 112B of the summing mechanism 106 to rotatably drive the summing mechanism. With the actuatable element 122A in a first position against the stop 124A, the actuatable element 122A is free to rotate into the second position against the stop 126A.

Because the end mechanism 108 is configured to provide more resistance to rotation in the first direction than the actuatable element 122A in the first position, the summing mechanism 106 distributes all the angular rotation of the input 112B to rotating the second output 116A of the branch driveline 117A in the first direction. Rotation of the second output 116A correspondingly rotates in the first direction the actuatable element 122A from the first position to the second position against the stop 126A as indicated by the directional arrow. The stop 126A prevents further rotation of the actuatable element 122A in the first direction, which correspondingly places an essentially infinite load on or resistance to rotation of the actuatable element 122A and output 116A.

Because the output 116A now provides more resistance to rotation in the first direction than the end mechanism 108, the summing mechanism 106 starts distributing all the angular rotation of the input 112B to rotating the first output 114A of the summing mechanism and input 114B of the end mechanism 108. In view of the configuration of the end mechanism 108 described above, the end mechanism distributes all the angular rotation of the input 114B to rotating the first output 116B of the branch driveline 117B. Rotation of the first output 116B correspondingly rotates in the first direction the actuatable element 122B from the first position to the second position against the stop 126B as indicated by the directional arrow. The stop 126B prevents further rotation of the actuatable element 122B in the first direction, which correspondingly places an infinite load on or complete resistance to rotation of the actuatable element 122B and output 116B in the first direction. Because both the outputs 116A, 116B are prevented from rotation in the first direction due to the engagement between the stops 126A, 126B and the actuatable elements 122A, 122B, the actuator 102 is prevented from further rotating the rotational input 112A in a first direction and stops actuating.

The actuator system 100 can be operated in a second mode where the controller 110 commands the actuator 102 to rotate the rotational input 112A in a second direction opposite the first direction. Rotation of the rotational input 112A in the second direction correspondingly rotates the input 112B of the summing mechanism 106 in the second direction to rotatably drive the summing mechanism. With the actuatable element 122A in the second position against the stop 126A, the actuatable element 122A is now free to rotate back into the first position against the stop 124A. Further, because the end mechanism 108 is configured to provide more resistance to rotation in the second direction than the actuatable element 122A in the second position, the summing mechanism 106 distributes all the angular rotation of the input 112B to rotating the second output 116A of the branch driveline 117A in the second direction. Rotation of the second output 116A in the second direction correspondingly rotates in second direction the actuatable element 122A from the second position to the first position against the stop 124A, such as indicated by the directional arrow in FIG. 2. The stop 124A prevents further rotation of the actuatable element 122A in the second direction, which correspondingly places an essentially infinite load on or resistance to rotation of the actuatable element 122A and output 116A in the second direction.

Because the output 116A now provides more resistance to rotation in the second direction than the end mechanism 108, the summing mechanism 106 starts distributing all the angular rotation of the input 112B to rotating the first output 114A of the summing mechanism and input 114B of the end mechanism 108 in the second direction. The end mechanism distributes all the angular rotation of the input 114B to rotating the first output 116B of the branch driveline 117B in the second direction. Rotation of the first output 116B correspondingly rotates in the second direction the actuatable element 122B from the second position to the first position against the stop 124B as indicated by the directional arrow in FIG. 2. The stop 124B prevents further rotation of the actuatable element 122B in the second direction, which correspondingly places an infinite load on or complete resistance to rotation of the actuatable element 122B and output 116B in the second direction. Because both the outputs 116A, 116B are prevented from rotation in the second direction due to the engagement between the stops 124A, 124B and the actuatable elements 122A, 122B, the actuator 102 is prevented from further rotating the rotational input 112A in the second direction and stops actuating.

In the above manner, the controller 110 controls the actuator 102 to move the actuatable elements 122A, 122B between the first and second positions using at least one summing mechanism and at least one end mechanism. Rotation of the actuatable elements 122A, 122B can be done sequentially in a particular order, sequentially in any order, or non-sequentially (e.g., concurrently). As described above, because rotation of the outputs 116A, 116B and actuatable elements 122A, 122B corresponds directly with rotation of the rotational input 112A, the status (e.g., angular position) of the actuatable elements can be determined from the angular rotation or amount of rotation of the rotational input 112A. The angular rotation of the rotational input 112A can be determined based on the angular position of the rotational input as sensed by only the sensor 104. For example, the sensor 104 can sense a first angular position of the rotational input 112A, and sense a second angular position of the rotational input 112A. The angular rotation of the rotational input 112A can then be determined by the sensor 104, or the controller 110, based on the difference between the first and second angular positions.

According to one embodiment, a first angular position of the rotational input 112A is set to correspond with the actuatable elements 122A, 122B being in the first position, and a second angular position of the rotational input 112A is set to correspond with the actuatable elements being in the second position. Accordingly, when the sensor 104 senses that the rotational input 112A is in the first angular position, even without any additional input from other sensors, the controller 110 determines that the actuatable elements 122A, 122B are in the first position. In contrast, when the sensor 104 senses that the rotational input 112A is in the second angular position, even without any additional input from other sensors, the controller 110 determines that the actuatable elements 122A, 122B are in the second position.

However, in some implementations, if the sensor 104 senses that the rotational input 112A is not in either of the first or second angular positions, then the controller 110 may determine one of three statuses: (1) the system 100 is functioning properly and the actuatable elements 122A, 122B are in the process of transitioning between the first and second positions; (2) the system 100 is not functioning properly due to a jam or blockage in the main driveline 115 or branch drivelines 117A, 117B; and (3) the system 100 is not functioning properly due to a disconnection in the main or branch drivelines. The controller 110 determines that the system 100 is functioning properly and the actuatable elements 122A, 122B are in the process of transitioning between the first and second positions when the rotational input 112A is rotating, but the angular position of the rotational input sensed by the sensor 104 is between the first and second angular positions. In contrast, the controller 110 determines that the system 100 is not functioning properly due to a jam in the drivelines when the rotational input 112A has prematurely stopped rotating and the angular position of the rotational input sensed by the sensor 104 is between the first and second angular positions. The controller 110 determines that the system 100 is not functioning properly due to a disconnection in the drivelines when the rotational input 112A is rotating and the angular position of the rotational input sensed by the sensor 104 is beyond the second angular position.

Referring to FIGS. 4A-4D, and according to one implementation, the first angular position of the rotational input 112A can be defined as any angular position within a first angular range 440, or positional range, and the second angular position of the rotational input can be defined as any angular position within a second angular range 442, or positional range. The size of the first angular range 440 can be defined by an angle $\beta$, and the second angular range 442 can be defined by an angle $\theta$. The angles $\beta$, $\theta$ are the same in some implementations, and different in other implementations. According to some implementations, for example, each of the angles $\beta$, $\theta$ is between 0° and 50°. In yet other implementations, each of the angles $\beta$, $\theta$ is between 10° and 30°. The position of the first and second angular ranges 440, 442 relative to each other can vary based on the particular configuration (e.g., speed ratios) of the system 100. For example, in one implementation, the first and second angular ranges 440, 442 substantially overlap each other such that the transition between the first and second positions of the actuatable elements 122A, 122B requires about 360° *N of rotation of the rotational input 112A, where N is any whole number greater than zero. However, in other implementations, such as the illustrated implementation, the first and second angular ranges 440, 442 do not overlap each other such that the transition between the first and second positions of the actuatable elements 122A, 122B requires less than about 360° of rotation (i.e., M° of rotation), or M°+ 360° *N of rotation, of the rotational input 112A. According to the illustrated implementation, as an example only, the angles $\beta$, $\theta$ are both about 30°, the first angular range 440 is positioned between 0° and 30° relative to a conventional polar coordinate chart, and the second angular range 442 is position between 270° and 300° relative to the same chart.

Figure 4A:
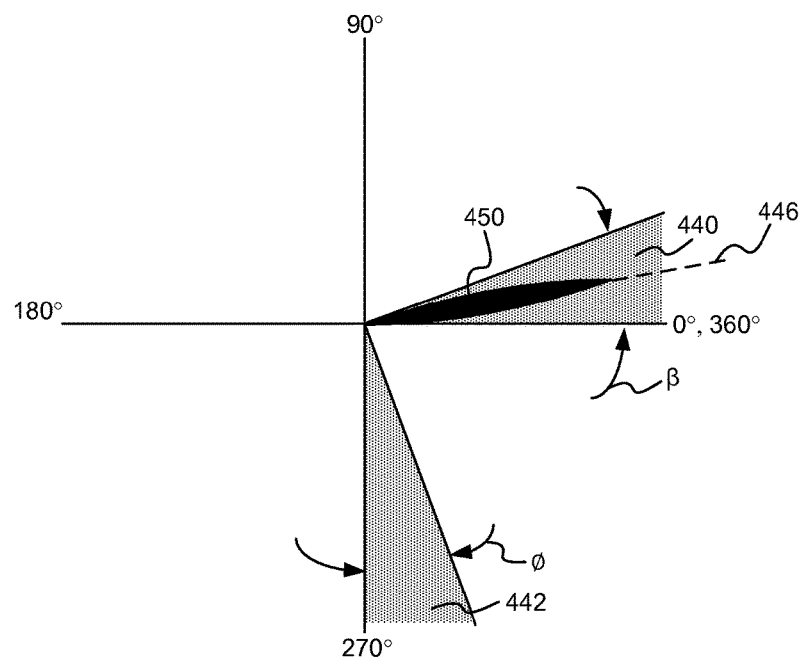
FIG. 4A is a polar coordinate chart showing a first angular position of an actuatable element relative to a first angular range and a second angular range according to one embodiment.
Figure 4B:
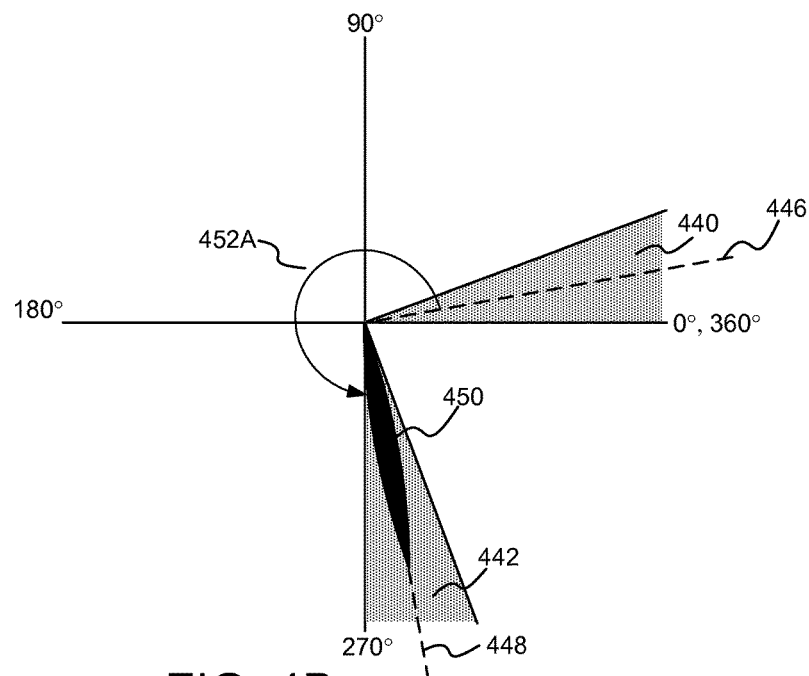
FIG. 4B is a polar coordinate chart showing a second angular position of an actuatable element relative to the first angular range and the second angular range according to one embodiment.

As shown in FIG. 4A, the angular position 450 of the rotational input 112A is in a first angular position 446, which can be considered a start position. The first angular position 446 is located within the first angular range 440. Accordingly, based on input from the sensor 104, the controller 110 determines that the actuatable elements 122A, 122B are properly positioned in the first position. When actuation of the actuatable elements 122A, 122B from the first position to the second position is desired, the actuator 102 rotates the rotational input 112A as shown by directional arrow 452A in FIG. 4B until the rotational input stops (e.g., via contact between actuatable elements and primary stops, such as stops 126A, 126B) at a second angular position 448, which can be considered an end position. The sensor 104 senses the second angular position 448 and the controller determines if the second angular position is in the second angular range 442. When the second angular position 448 is in the second angular range 442 as shown, the controller 110 determines that the actuatable elements 122A, 122B are properly positioned in the second position. When actuation of the actuatable elements 122A, 122B from the second position back to the first position is desired, the actuator 102 rotates the rotational input 112A from the second angular position, which can now be considered a start position, in a direction opposite the directional arrow 452A in FIG. 4B until the rotational input stops (e.g., via contact between actuatable elements and primary stops, such as stops 124A, 124B) at the first angular position 446, which can now be considered an end position.

The rotation of the rotational input 112A between, and stopping at, the first angular position 446 within the first angular range 440 and the second angular position 448 within the second angular range 442 represents proper operation of the drivelines of the system 100. However, improper operation of the drivelines, or malfunctioning, of the system 100 can also be determined as shown in FIGS. 4C and 4D.

Figure 4C:
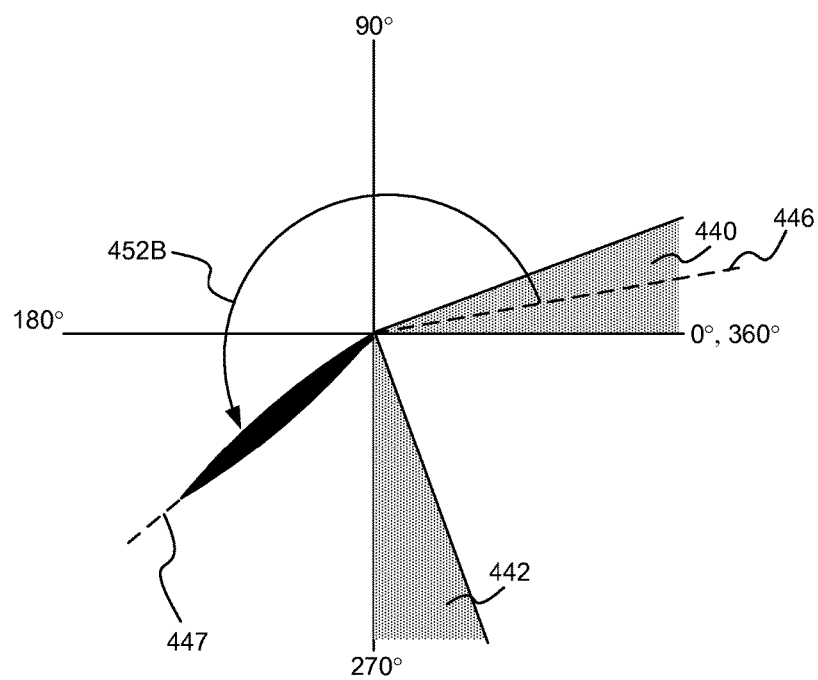
FIG. 4C is a polar coordinate chart showing a third angular position of an actuatable element relative to the first angular range and the second angular range according to one embodiment.
Figure 4D:
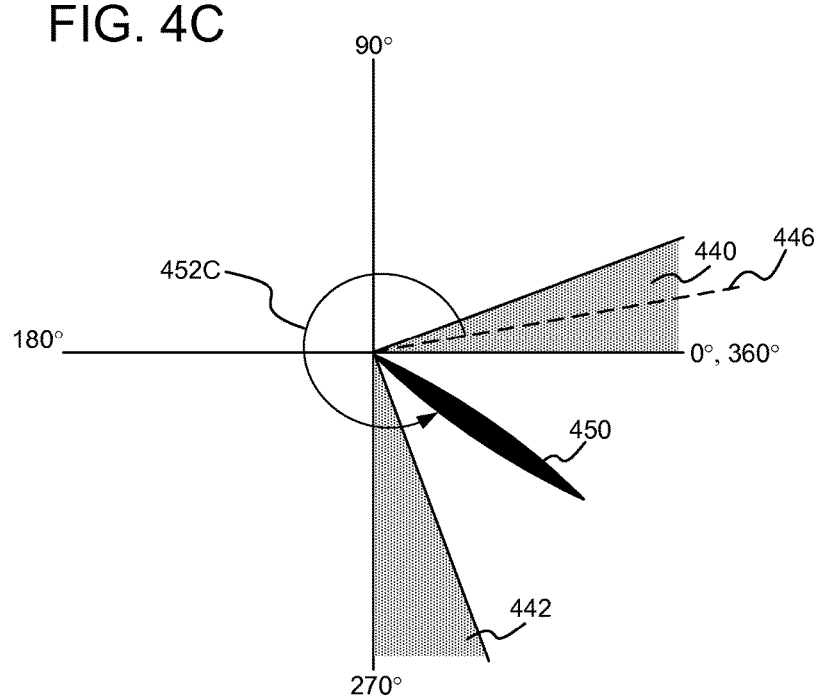
FIG. 4D is a polar coordinate chart showing a fourth angular position of an actuatable element relative to the first angular range and the second angular range according to one embodiment.

Referring to FIG. 4C, during actuation of the actuatable elements 122A, 122B from the first position towards the second position, the actuator 102 may rotate the rotational input 112A as shown by directional arrow 452B until the rotational input stops at a third angular position 447, which can be considered an end position, between the first and second angular ranges 440, 442. In other words, the third angular position 447 of the stopped rotational input 112A is not in the second angular range 442 associated with the actuatable elements 122A, 122B being in the second position. Accordingly, with the rotational input 112A stopped in the third angular position 447, the controller 110 may determine that a jam, preventing complete rotation of the rotational input into the second angular range 442, has occurred in one or more of the drivelines of the system 100. As will be explained below, in some implementations, due to the predictable (e.g., sequential and/or orderly) actuation of the actuatable elements 122A, 122B, depending on the location of the third angular position 447 relative to the first and second angular ranges 440, 442, the controller 110 can determine which of the drivelines, or which of the actuatable elements, is the source of the jam.

Alternatively, in some implementations, the actuator system 100 can include one or more intermediate stops 125A, 125B configured to intentionally stop the rotational input 112A at an angular position between the first and second angular ranges 440, 442. For example, instead of being associated with a jam in the drivelines of the system, the third angular position 447 can be associated with an intermediate end position. Accordingly, when the rotational input 112A is stopped in the third angular position 447, as sensed by the sensor 104, the controller 110 determines that the actuatable elements 122A, 122B are properly positioned in an intermediate position between the first and second positions. The intermediate stops 125A, 125B can be controlled by any of various systems 101 or sub-systems ancillary to or forming part of the actuator system 100.

Generally, the intermediate stops 125A, 125B are controlled to stop rotation of the rotational input 112A as it rotates from the first position toward the second position, and/or rotates from the second position toward the first position. In one implementation, after the stopped rotational input 112A is confirmed via the sensor 104 to be in the intermediate position, the intermediate stops 125A, 125B are moved (e.g., retracted) out of the path of the actuatable elements 122A, 122B, as shown by directional arrows in FIG. 1. With the intermediate stops 125A, 125B out of the way, the rotational input 112A is free to continue rotation into the first or second position. When stoppage of the rotational input 112A in the intermediate position is again desired, the intermediate stops 125A, 125B can be moved (e.g., extended) back into the pathway of the actuatable elements 122A, 122B. Although only one set of intermediate stops 125A, 125B is shown for stopping the rotational input 112A at a single intermediate position, in other embodiments, multiple sets of intermediate stops can be used for stopping the rotational input at multiple intermediate positions as desired.

Now referring to FIG. 4D, during actuation of the actuatable elements 122A, 122B from the first position towards the second position, the actuator 102 may rotate the rotational input 112A as shown by directional arrow 452C until the rotational input rotates past the second angular range 442. In other words, the rotational input 112A did not stop within the second angular range 442 as expected. Accordingly, with the rotational input 112A rotating past the second angular range 442, the controller 110 may determine that a disconnection, potentially preventing proper positioning, or proper detection of the position, of the actuatable elements 122A, 122B.

Although the above embodiment of the actuator system 100 has been described as having an actuator 102 that generates a rotational input, and summing mechanisms that receiving rotational input and provide rotational output, in other embodiments, the actuator can provide a non-rotational (e.g., linear) input and the summing mechanisms receive non-rotational input and provide non-rotational output. For example, the summing mechanisms can be summing linkages configured to divide non-rotational movement as an input into non-rotational movement of at least two outputs.

Figure 2:
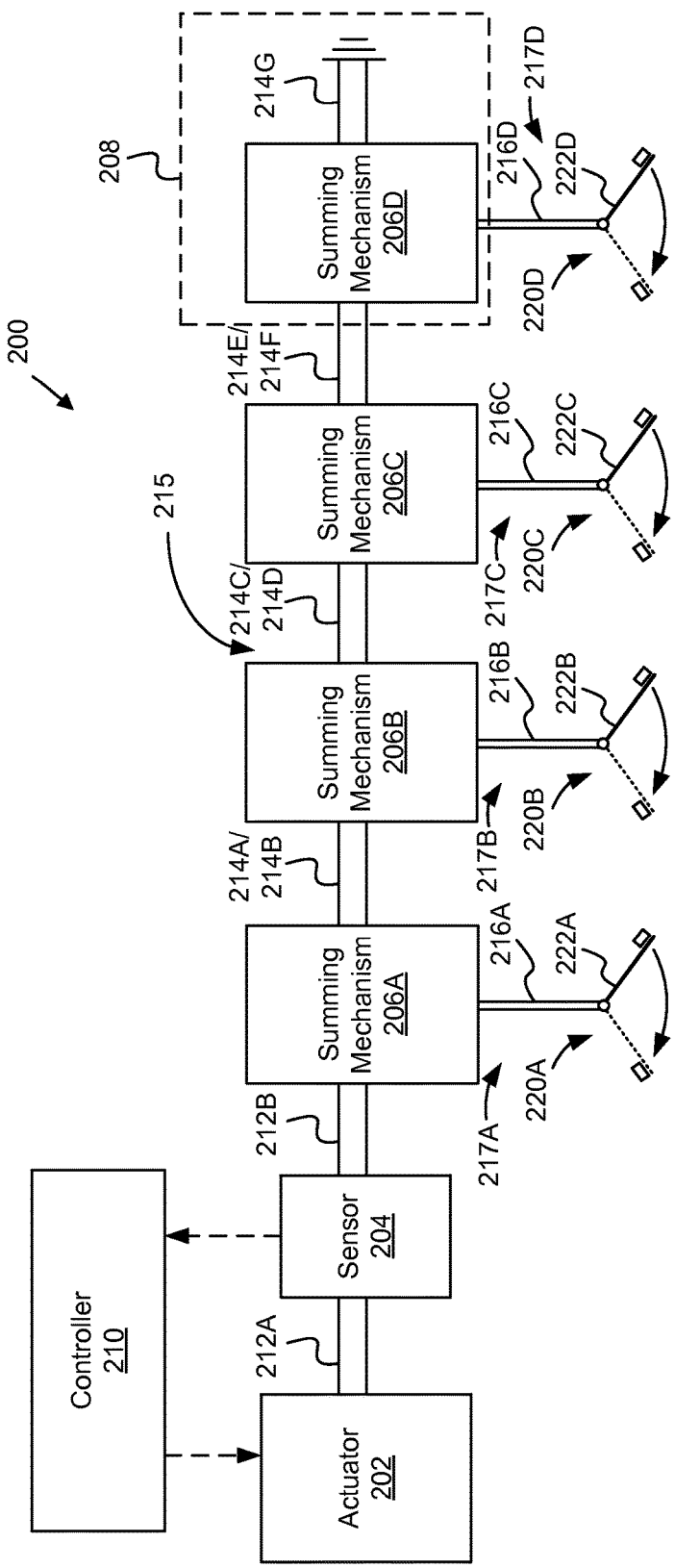
FIG. 2 is a schematic block diagram of another actuator system according to yet another embodiment.

Although the actuator system 100 of the embodiment of FIG. 1 includes one summing mechanism, as shown in FIG. 2, in other embodiments, an actuator system can include more than one summing mechanism and operate in a manner analogous to the actuator system 100 with a single summing mechanism. The actuator system 200 of FIG. 2 includes features analogous to the features of the actuator system 100, with like numbers referring to like elements. For example, analogous features of the systems share the same core numbers, but in a different series and different suffix in some instances. Accordingly, a description of a feature of the actuator system 100 in the 100-series, and with a different suffix, applies equally to the analogous feature of the actuator system 200 in the 200-series with similar suffix.

In contrast to the actuator system 100, the main driveline 215 of the actuator system 200 includes multiple summing mechanisms 206A-C, an input 212B to a first summing mechanism 206A, first outputs 214A, 214C, 214E to respective first, second, and third summing mechanisms 206A-C, and inputs 214B, 214D to respective second and third summing mechanisms 206A, 206B. Additionally, the summing mechanisms 206A-C also include respective second outputs 216A-C that form part of respective branch drivelines 217A-C branching off of the main driveline 215.

Additionally, the main driveline 215 includes an end mechanism 208. The end mechanism 208 includes an input 214F, and a first output 216D that forms part of a branch driveline 217D branching off of the main driveline 215. Although the end mechanism 208 functions as a non-summing mechanism, the end mechanism 208 includes a summing mechanism 206D as shown. The summing mechanism 206D includes a second output 214G forming the main driveline 215, and the input 214F is an input of the summing mechanism 206D and the first output 216D is a first output of the summing mechanism 206D. However, unlike the outputs forming the main driveline 215 of the summing mechanisms 206A-C, the second output 214G of the summing mechanism 206D is non-rotatably fixed or grounded to a relatively stationary object. In other words, the second output 214G is prevented from rotation, which places an infinite load or resistance to rotation on the second output. Accordingly, the summing mechanism 206D distributes all of the input from the input 214F to the first output 216D. In this manner, despite having a summing mechanism, the end mechanism 208 functions as an end mechanism.

Figure 5:
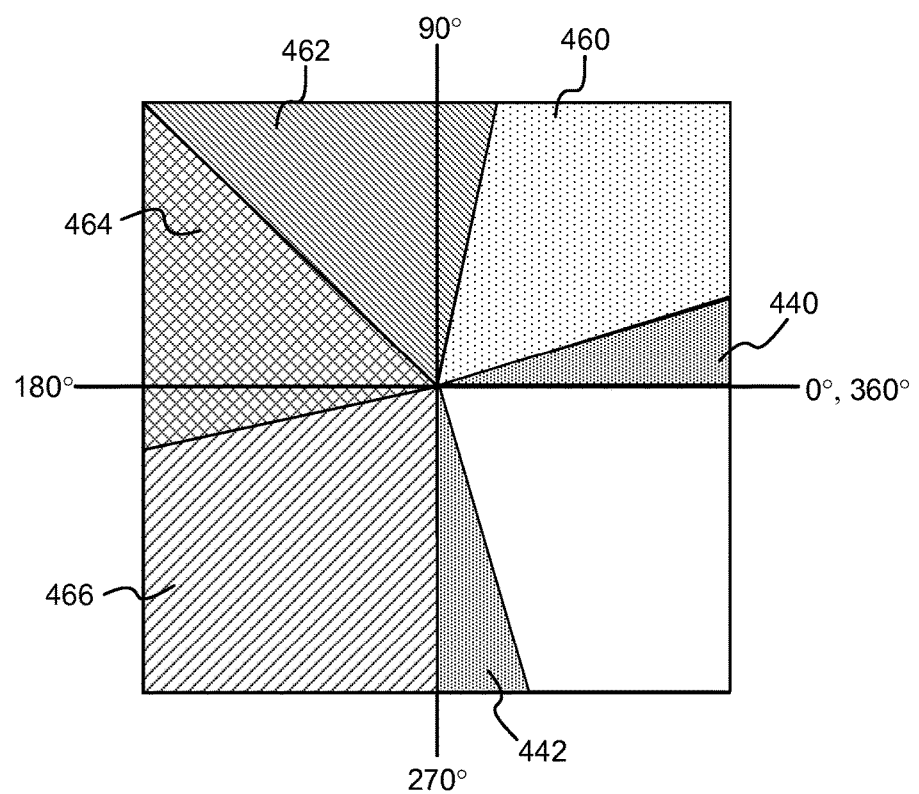
FIG. 5 is a polar coordinate chart showing a good angular range and multiple bad angular ranges according to one embodiment.

Each branch driveline 217A-D is configured to actuate respective actuatable elements 222A-D in a manner as described above in relation to the actuator system 100. Further, like some implementations of the actuator system 100, in certain implementations, the summing mechanisms 206A-C facilitate the predictable (e.g., sequential and/or orderly) actuation of the actuatable elements 222A-D. Accordingly, in some implementations, due to the predictable actuation of the actuatable elements 222A-D during transitions between first and second positions, depending on the angular position of the rotational input 212A when stopped (e.g., rotation is prevented) between first and second angular ranges, the controller 210 can determine which of the drivelines, or which of the actuatable elements, is the source of a jam. Referring to FIG. 5, angular positions between the first and second angular ranges 440, 442 can be divided into multiple intermediate angular ranges each associated with the jam of a respective one of the actuatable elements 222A-D. For example, first through fourth intermediate angular ranges 460, 462, 464, 466 associated with the four actuatable elements 222A-D, respectively, are positioned between the first and second angular ranges 440, 442.

Applying the principles described above regarding FIG. 4C, during actuation of the actuatable elements 222A-D from the first position towards the second position, the actuator 202 may rotate the rotational input 212A until the rotational input stops inadvertently at the third angular position 447 between the first and second angular ranges 440, 442. Depending on which of the intermediate angular ranges 460, 462, 464, 466 the third angular position 447 is located, the controller 210 determines which of the actuatable elements 222A-D, and associated branch drivelines, is causing the jam. For example, if the third angular position 447 is in the first intermediate angular range 460, then the controller 210 determines that the actuatable element 222A, and associated branch driveline, is causing a jam. Likewise, for example, if the third angular position 447 is in the third intermediate angular range 464, then the controller 210 determines that the actuatable element 222C, and associated branch driveline, is causing a jam.

Figure 3:
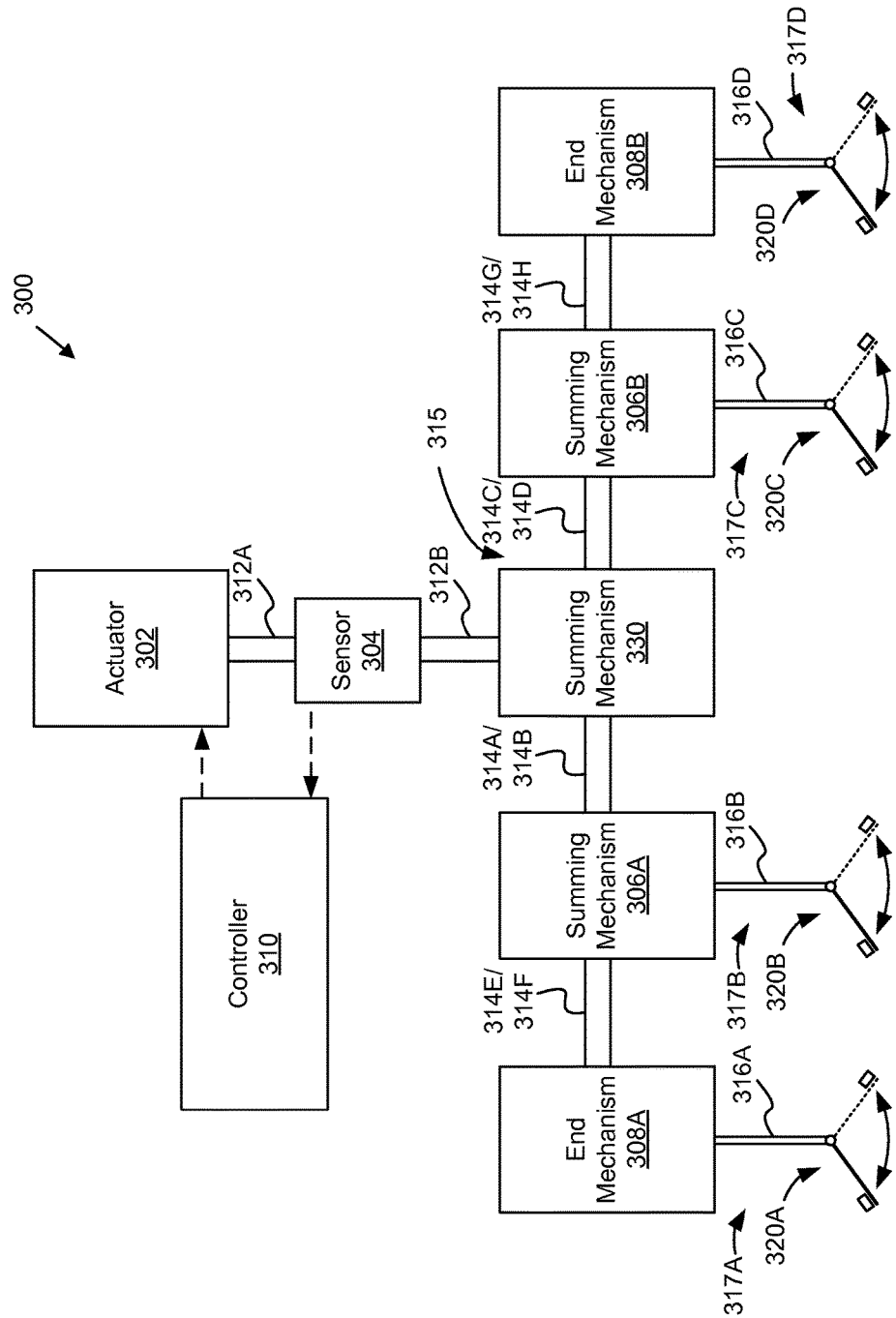
FIG. 3 is a schematic block diagram of an actuator system according to an additional embodiment.

Although each of the actuator systems 100, 200 of the embodiments of FIGS. 1 and 2 provide a rotational input at one end of a main driveline, one or more summing mechanisms along the main driveline, and a single end mechanism at an opposing end of the main driveline, in some embodiments, as shown in FIG. 3, an actuator system 300 can provide a rotational input 312B in the middle of a main driveline 315 and distribute the rotational input in opposing directions along the main driveline using a summing mechanism 330. The actuator system 300 of FIG. 3 includes features analogous to the features of the actuator systems 100, 200 with like numbers referring to like elements. For example, analogous features of the systems share the same core numbers, but in a different series and different suffix in some instances. Accordingly, a description of a feature of the actuator systems 100, 200 in the 100-series and 200-series, and with a different suffix, applies equally to the analogous feature of the actuator system 300 in the 300-series with similar suffix.

The summing mechanism 330 can be configured in a manner similar to the summing mechanisms 306A, 306B of the actuator system 300. More specifically, like the summing mechanisms 306A, 306B, the summing mechanism 330 includes an input and two outputs. However, unlike the summing mechanisms 306A, 306B, instead of having a respective first output 314E, 314G driving another mechanism of the main driveline 315, and a respective second output 316B, 316C driving a respective branch driveline 317B, 317C, the summing mechanism 330 includes first and second outputs 314A, 314C each driving a respective one of the inputs 314B, 314D of the summing mechanism 306A, 306B. Driving a main driveline from a middle of the main driveline, as opposed to the end of the driveline, may reduce the power from the actuator necessary to drive the main driveline, and the branch drivelines. Accordingly, a smaller, or less-powerful, actuator can be used, which may reduce the size and cost of the actuator system. Additionally, in some implementations, there might be more space in the wing of the aircraft at the middle of the driveline to spatially fit the actuator 302 and sensor 304 that respectively drive and sense the actuatable elements.

Figure 6:
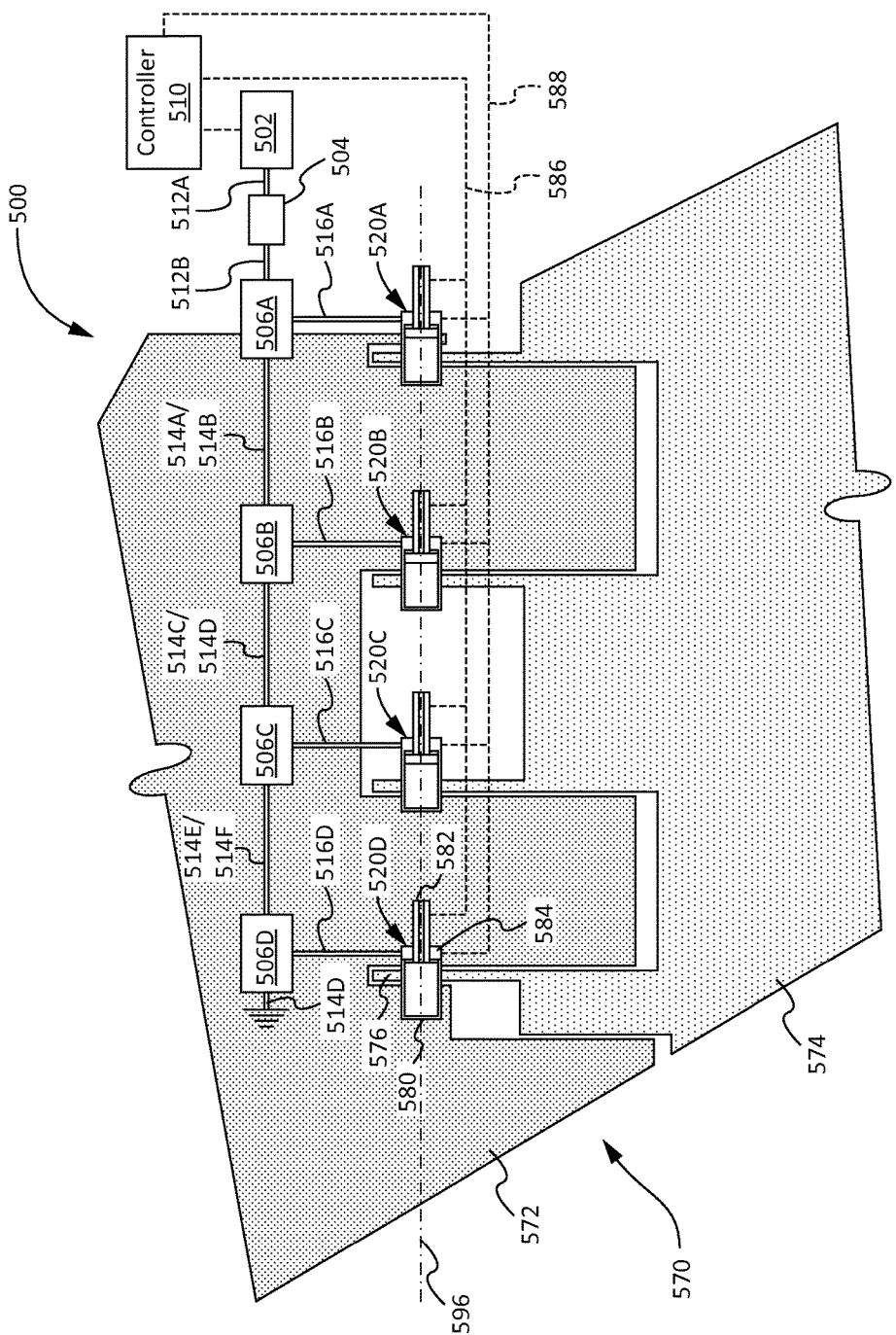
FIG. 6 is a partial schematic block diagram of a foldable wingtip of an aircraft and an associated actuator system according to one embodiment.
Figure 7:
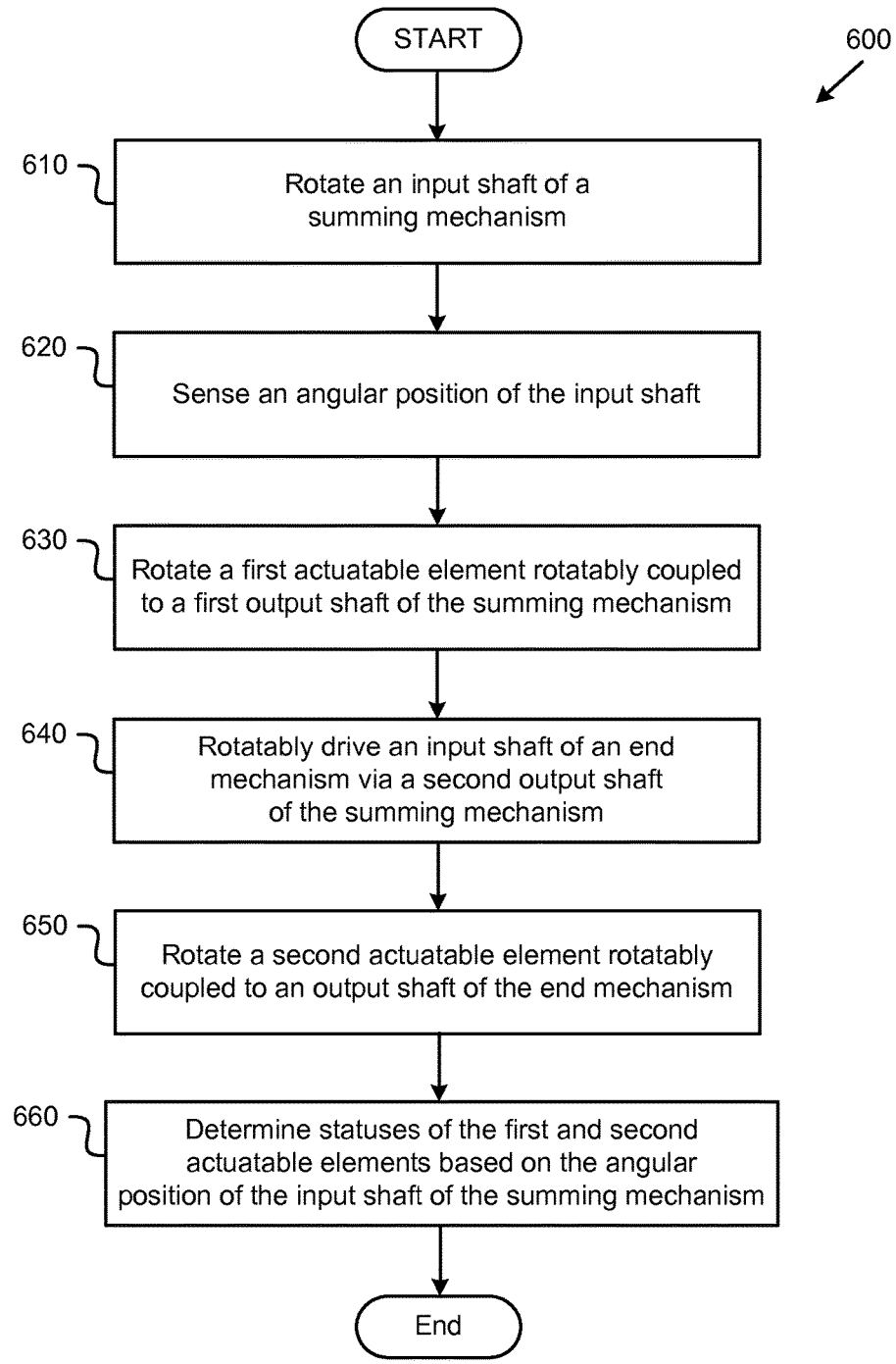
FIG. 7 is a schematic flow diagram of a method for actuating actuatable elements according to one embodiment.

The actuator systems of the present disclosure can be used for actuating actuatable elements and determining the status of the actuatable elements, and other elements operably linked to the actuatable elements, for any of various structures, assemblies, and applications. As described above, one such assembly includes a foldable wingtip assembly of an aircraft as represented in FIG. 6. The foldable wingtip assembly can be the same as or similar to the foldable wingtip assembly described in U.S. Pat. No. 5,427,329, which is incorporated herein by reference. In one embodiment, a foldable wingtip assembly 570 includes a wing with a base portion 572 and a tip portion 574 that is pivotably coupled to the base portion 572. The tip portion 574 of the wing is pivoted relative to the base portion 572 via a separate actuation system (not shown). Moreover, the tip portion 574 rotates between an extended or spread position (as shown) for aircraft flight, and a retracted or upwardly-folded position for taxiing and parking.

To ensure the tip portion 574 remains in the extended position during flight, the foldable wingtip assembly 570 includes an actuator system 500 with a plurality of latch pins 580. The latch pins 580 are actuatable between an engaged position (as shown) and a disengaged position. In the engaged position, the latch pins 580 each extend through a clevis assembly 576 formed by the base portion 572 and tip portion 574. For example, the clevis assembly 576 may include an opening in the tip portion 574 and a recess in the base portion 572. In the engaged position, a latch pin 580 then extends through the opening in the tip portion 574 and is received in the recess of the base portion 572 to lock the tip portion 574 in place in the extended position. In the disengaged position, the latch pin 580 is moved out from engagement with the clevis assembly 576 such that the tip portion 574 can be moved into the retracted position. Each of the latch pins 580 can be an elongate cylinder or shaft-like element with a central axis extending a length of the pins. As shown in FIG. 6, the central axes 596 of the latch pins 580 can be co-axial such that the pins actuate in a direction co-axial with the central axes 596.

Actuation of the latch pins 580 can be accomplished using any of various techniques. In the illustrated embodiment, the actuator system 500 includes a controller 510 that commands latch pin actuator assemblies to actuate the latch pins 580 via electronic signals 586 sent from the controller. Each actuator assembly can be any of various actuator assemblies known in the art, such as electric-based, hydraulic-based, magnetic-based, and rotary-based. To ensure the latch pins 580 remain in the engaged position, such as during flight, the actuator system 500 includes primary locks 584 and secondary locks 520A-D. Generally, the primary locks 584 and secondary locks 520A-D are actuatable between open and closed positions. In the open position, the primary and secondary locks do not prevent the latch pins 580 from moving into the disengaged position from the engaged position. However, in the closed position, the primary and secondary locks physically prevent the latch pins 580 from moving into the disengaged position from the engaged position. Each latch pin 580 is locked in place by a respective one of the primary locks 584 and a respective one of the secondary locks 520A-D. In the illustrated embodiment, the controller 510 commands the primary locks 584 to actuate via electronic signals 588 sent from the controller.

The primary locks 584 and secondary locks 520A-D can have any of various configurations for physically restraining the latch pins 580 in the engaged position and allowing movement of the latch pins in the disengaged position. In one implementation, the primary locks 584 and secondary locks 520A-D are configured in a manner similar to those described in U.S. Pat. No. 5,427,329 and U.S. Pat. No. 5,201,479, which are incorporated herein by reference. Actuation of the primary locks 584 and secondary locks 520A-D may be dependent on each other. For example, in one implementation, each secondary lock 520A-D cannot be physically actuated into the lock position until the corresponding primary lock 584 is in the lock position. Likewise, each primary lock 584 cannot be physically actuated into the open position until the corresponding secondary lock 520A-D is in the open position. In this manner, if the secondary locks 520A-D are in the lock position, then it can be inferred that the primary locks 584 also are in the lock position. Moreover, the system 500 is configured such that if the primary locks 584 are in the lock position, then the latch pins are in the engaged position. Therefore, by knowing or sensing the status or position of the secondary locks 520A-D, the status or position of the primary locks 584 and latch pins 580 can be determined.

The status or position of all the secondary locks 520A-D can be determined by a single sensor (e.g., sensor 504) at the rotational input of the actuator 502 without the need for additional sensors, sensors at each of the branch drivelines, or each of the latches. Therefore, the status or position of the primary locks 584 and latch pins 580 can be determined by a single sensor. Generally, the portion of actuator system 500 that actuates the secondary locks 520A-D is configured in the same manner as the actuator system 200 of FIG. 2, with like numbers referring to like elements. Therefore, the description of the actuator system 200 applies to the actuator system 500. For example, the actuatable elements 222A-D or actuatable element assemblies 220A-D of the actuator system 200 can be the secondary locks 520A-D of the actuator system 500. Also, the first position of the actuatable elements 222A-D can be the open position of the secondary locks 520A-D, and the second position of the actuatable elements 222A-D can be the lock position of the secondary locks 520A-D. The summing mechanisms 506A-D are operatively linked to predictably or non-predictably actuate the secondary locks 520A-D. Further, the controller 510 receives input from the sensor 504 to determine if the secondary locks 520A-D are in the open position, lock position, transitioning between the open and lock positions, jammed, or disconnected in the same manner as described above.

According to one embodiment, a method 600 for actuating actuatable elements includes rotating an input shaft of a summing mechanism at 610. The method 600 also includes sensing an angular position of the input shaft at 620. Additionally, the method 600 includes rotating a first actuatable element that is rotatably coupled to a first output shaft of the summing mechanism at 630. The method 600 further includes rotatably driving an input shaft of an end mechanism via a second output shaft of the summing mechanism at 640. Also, the method 600 includes rotating a second actuatable element that is rotatably coupled to an output shaft of the end mechanism at 650. The method 600 additionally includes determining statuses of the first and second actuatable elements based on the angular position of the input shaft of the summing mechanism at 660. The method 600 can be executed using any one of the above-described embodiments of the actuator system of the present disclosure.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages (e.g., LabVIEW). The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
   an actuator providing a movable input that drives a beginning of a main driveline;

a first summing mechanism that unequally divides an input of the first summing mechanism proportionally between a first output that drives the main driveline, and a second output that drives a beginning of a first branch driveline, in response to differences between a first load and a second load applied respectively to the first output and to the second output, the input of the first summing mechanism being movably driven by the movable input of the actuator and the second output of the first summing mechanism being movably coupled to a first actuatable element at an end of the first branch driveline;

an end mechanism at an end of the main driveline, with an input, and a first output, wherein the input of the end mechanism is movably driven by the first output of the first summing mechanism, and the first output of the end mechanism is movably coupled to a second actuatable element at an end of a second branch driveline;

a sensor, disposed at a location of the main driveline between the actuator at the beginning of the main driveline and the first summing mechanism, that senses a position of the movable input of the actuator; and a controller that determines a jam status and a disconnect status of the first and second actuatable elements from the sensed position of the movable input of the actuator.

2. The system of claim 1, further comprising a second summing mechanism with an input movably driven by the first output of the first summing mechanism, a second output coupled to a third actuatable element, and a first output movably coupled to the input of the end mechanism, the input of the end mechanism being movably driven by the first output of the first summing mechanism via the second summing mechanism, wherein the controller determines the status of the third actuatable element based on the sensed position of the input of the first summing mechanism.

3. The system of claim 1, wherein the end mechanism comprises a second summing mechanism, the input of the end mechanism being an input of the second summing mechanism and the first output of the end mechanism being a first output of the second summing mechanism, wherein the second summing mechanism of the end mechanism further comprises a second output, and wherein the second output of the second summing mechanism is non-movably fixed relative to the input and first output of the second summing mechanism.

4. The system of claim 1, wherein the movable input is a rotational input, the input of the first summing mechanism is rotatably driven by the rotational input of the actuator, the second output of the first summing mechanism is rotatably coupled to the first actuatable element, the input of the end mechanism is rotatably driven by the first output of the first summing mechanism, the first output of the end mechanism is rotatably coupled to the second actuatable element, the sensor senses an angular position of the rotational input of the actuator, and the controller determines the status of the first and second actuatable elements from a sensed angular position of the rotational input of the actuator.

5. The system of claim 4, wherein at least one of the first summing mechanism and end mechanism comprises a differential.

6. The system of claim 1, further comprising first and second latch pin assemblies, wherein each of the first and second actuatable elements comprises a lock of the first and second latch pin assemblies, respectively.

7. The system of claim 6, wherein each latch pin assembly comprises a latch pin that is actuatable between first and second positions, and wherein the controller determines whether the latch pins of the latch pin assemblies are in the first or second positions based on the status of the locks.

8. The system of claim 1, wherein the controller determines a first status of at least one of the first and second actuatable elements if the sensed position of the movable input is within a first positional range, and determines a second status of at least one of the first and second actuatable elements if the sensed position of the movable input is within a second positional range outside of the first positional range.

9. The system of claim 1, further comprising first and second stop pairs, the first stop pair comprising two stops that limit a range-of-motion of the first actuatable element, and the second stop pair comprising two stops that limit a range-of-motion of the second actuatable element.

10. The system of claim 9, wherein at least one stop of the first and second stop pairs is extendable to limit the range-of-motion of a respective one of the first and second actuatable elements, and retractable to not limit the range-of-motion of the respective one of the first and second actuatable elements.

11. A system, comprising:
an actuator providing a rotational input that drives a beginning of a main driveline;
a first summing mechanism that unequally divides an input of the first summing mechanism proportionally between a first output and a second output in response to differences between a first load and a second load applied respectively to the first output and to the second output, wherein the input of the first summing mechanism is rotatably driven by the rotational input of the actuator;
a driveline mechanism selected from a group consisting of a second summing mechanism and a non-summing mechanism, the driveline mechanism having an input that is rotatably driven by the first output of the first summing mechanism, the driveline mechanism also having an output that rotatably drives a first actuatable element;
a sensor, disposed at a location of the main driveline between the actuator at the beginning of the main driveline and the first summing mechanism, that senses an angular position of the rotational input of the actuator; and
a controller that determines a jam status and a disconnect status of the first actuatable element from the sensed angular position of the rotational input of the actuator.

12. The system of claim 11, wherein the second output of the first summing mechanism rotatably drives a second actuatable element, and wherein the controller determines a jam status and a disconnect status of the second actuatable element from the sensed angular position of the rotational input of the actuator.

13. The system of claim 12, wherein the driveline mechanism selected is the second summing mechanism, the system further comprising a third summing mechanism with an input that is rotatably driven by an output of the second summing mechanism, the third summing mechanism rotatably driving a third actuatable element, and wherein the controller determines a jam status and a disconnect status of the third actuatable element from the sensed angular position of the rotational input of the actuator.

14. The system of claim 12, wherein the first actuatable element and the second actuatable element are sequentially driven by the driveline mechanism and the first summing mechanism, respectively.

15. The system of claim 12, further comprising first and second latch pin assemblies each having a latch pin actuatable between an engaged position and a non-engaged position, the latch pins of the first and second latch pin assemblies being co-axial, and wherein each of the first and second actuatable elements comprises a lock of the first and second latch pin assemblies, respectively.

16. The system of claim 11, further comprising a third summing mechanism rotatably driven by the first summing mechanism, the third summing mechanism rotatably driving a second actuatable element, wherein the controller determines a status of the second actuatable element from the sensed angular position of the rotational input of the actuator.

17. The system of claim 11, wherein each of the first and second summing mechanisms comprises a differential.

18. The system of claim 12, further comprising an aircraft having a foldable wingtip, the aircraft comprising first and second latch pin assemblies each having a latch pin actuatable between a first position engaged with the foldable wingtip and a second position not engaged with the foldable wingtip, wherein each of the first and second actuatable elements comprises a lock of the first and second latch pin assemblies, respectively.

19. A method, comprising:
rotating an input shaft of a summing mechanism of a main driveline, wherein an angular position of the input shaft varies based on differences between a load applied to a first output shaft of the summing mechanism and a load applied to a second output shaft of the summing mechanism;
sensing, at the input shaft of the summing mechanism, an angular position of the input shaft of the summing mechanism;
rotating a first actuatable element rotatably coupled to the second output shaft of the summing mechanism;
rotatably driving an input shaft of an end mechanism at an end of the main driveline via the first output shaft of the summing mechanism;
rotating a second actuatable element rotatably coupled to a first output shaft of the end mechanism; and
determining a jam status and a disconnect status between the input shaft of the summing mechanism and the first and second actuatable elements based on the angular position of the input shaft of the summing mechanism.

20. The method of claim 19, wherein rotating the first actuatable element comprises restricting a range-of-motion of the first actuatable element between two stops, and rotating the second actuatable element comprises restricting a range-of-motion of the second actuatable element between two stops.

* * * * *